United States Patent [19]

Ikeda

[11] Patent Number: 4,496,977
[45] Date of Patent: Jan. 29, 1985

[54] SYNCHRONIZING CIRCUIT FOR MATRIX TELEVISION SET

[75] Inventor: Masayuki Ikeda, Suwa, Japan

[73] Assignee: Kabushiki Kaisha Suwa Seikosha, Tokyo, Japan

[21] Appl. No.: 497,489

[22] Filed: May 24, 1983

Related U.S. Application Data

[62] Division of Ser. No. 295,192, Aug. 21, 1981, Pat. No. 4,393,405.

[30] Foreign Application Priority Data

Aug. 22, 1980 [JP] Japan .................................. 55-116278

[51] Int. Cl.³ .............................................. H04N 5/04
[52] U.S. Cl. ...................................... 358/148; 358/241
[58] Field of Search ................ 358/148, 153, 241; 340/749, 768, 789

[56] References Cited

U.S. PATENT DOCUMENTS 3,752,910  8/1973  Lewis .................................... 358/241
3,771,016  11/1973  Toba et al. ............................ 358/240
3,909,788  9/1975  Kaelin et al. ......................... 358/241
4,198,659  4/1980  Iijima et al. .......................... 358/153

Primary Examiner—Richard Murray
Attorney, Agent, or Firm—Blum, Kaplan, Friedman, Silberman & Beran

[57] ABSTRACT

A synchronizing circuit especially suitable for a matrix television set using a flat display, such as comprised of liquid crystals, light emitting diodes or electro-luminescent elements in place of a cathode ray tube, is provided. Signals necessary for horizontal and vertical scannings, or the like, are obtained by dividing the signal from an oscillator circuit. The frequency of the oscillator circuit does not equal that of the horizontal scanning signal, that is, in the order of 16 KHz. Phase comparison is performed on a horizontal synchronizing signal and a scanning signal, which is obtained by dividing the signal from the oscillator circuit, to apply negative feedback to the oscillator circuit whereby synchronization is performed. The oscillator is voltage controlled. The circuit is fabricated in a substantially integrated construction using few external parts.

11 Claims, 9 Drawing Figures

SYNCHRONIZING CIRCUIT FOR MATRIX TELEVISION SET

BACKGROUND OF THE INVENTION

This is a division of application Ser. No. 295,192, filed Aug. 21, 1981, now U.S. Pat. No. 4,393,405, July 12, 1983.

This invention relates generally to a television set having a matrix type display comprised of liquid crystal display elements and more particularly, to a matrix television set wherein signals for horizontal and vertical scannings are obtained from one oscillator circuit. Conventional television sets using a cathode ray tube for display are generally well known. The circuitry is subject to integration as, for example, in "An integrated synchronizing circuit for TV receivers", pp 227–233 of IEEE transactions BTR-16 1970 No. 3.

In a synchronizing circuit according to the prior art, vertical and horizontal synchronizations are effected separately and two oscillator circuits are required. The oscillation frequency of the horizontal synchronizing circuit is equal to the frequency of the horizontal scanning signal, that is, approximately 16 kilohertz. The oscillation frequency of the vertical synchronizing circuit is 60 Hz in the United States and Japan.

A matrix television set needs one additional oscillator for generating a shift clock pulse. Thus, the synchronizing circuits of prior art matrix television set have the following disadvantages. First, there is a need for three oscillators and it is difficult to provide a circuit in the form of an integrated circuit, in particular, in the form of a C-MOS integrated circuit.

Further, in a television set using a cathode ray tube, a phase comparator of the AFC circuit is easily constructed by using a serrated waveform because the scanning deflection is effected by the serrated waves. On the other hand, a matrix television set requires a circuit system of good efficiency without using a serrated wave.

Additionally, power consumption of the synchronizing circuit in the prior art matrix television sets is large.

What is needed is a synchronizing circuit for a matrix television set which is simple in construction, can be formed as an integrated circuit and consumes little power.

SUMMARY OF THE INVENTION

Generally speaking, in accordance with the invention, a synchronizing circuit especially suitable for a matrix television set using a flat display, such as comprised of liquid crystals, light emitting diodes or electroluminescent elements in place of a cathode ray tube, is provided. Signals necessary for horizontal and vertical scannings, or the like, are obtained by dividing the signal from an oscillator circuit. The frequency of the oscillator circuit does not equal that of the horizontal scanning signal, that is, in the order of 16 KHz. Phase comparison is performed on a horizontal synchronizing signal and a scanning signal, which is obtained by dividing the signal from the oscillator circuit, to apply negative feedback to the oscillator circuit whereby synchronization is performed. The oscillator is voltage controlled. The circuit is fabricated in a substantially integrated construction using few external parts. Power consumption and size are reduced.

The synchronizing circuit is used in a matrix television set in which display means include picture elements arranged in matrix form and connected so that each picture element is selectable in both the line and column directions. The display is made by selecting the lines and columns successively. The synchronizing circuit includes a voltage controlled oscillator for producing a clock signal for selecting columns. Also included is means for dividing the frequency output of the voltage controlled oscillator to produce a clock signal for selecting the lines. The phase of the frequency divider output is compared with the horizontal synchronizing signal of the television transmission, and negative feedback is applied to the voltage controlled oscillator by an output of the phase comparison circuit so that the phase difference between the horizontal synchronizing signal and the frequency division output approaches zero.

Accordingly, it is an object of this invention to provide an improved synchronizing circuit for a matrix television set having fewer components and capable of substantial production simplification as an integrated circuit.

Another object of this invention is to provide an improved synchronizing circuit for a matrix television set which reduces the number of oscillators required to provide sweep synchronization.

A further object of this invention is to provide an improved synchronizing circuit for a matrix television set which is of small size, low power consumption and portable.

Still another object of this invention is to provide an improved synchronizing circuit for a matrix television set which uses only one oscillator circuit which is entirely integrated without external parts.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

The synchronizing circuit in accordance with this invention is for use in a matrix television set. A conventional matrix television set is described prior to a description of the synchronizing circuit of this invention.

Figure 1:
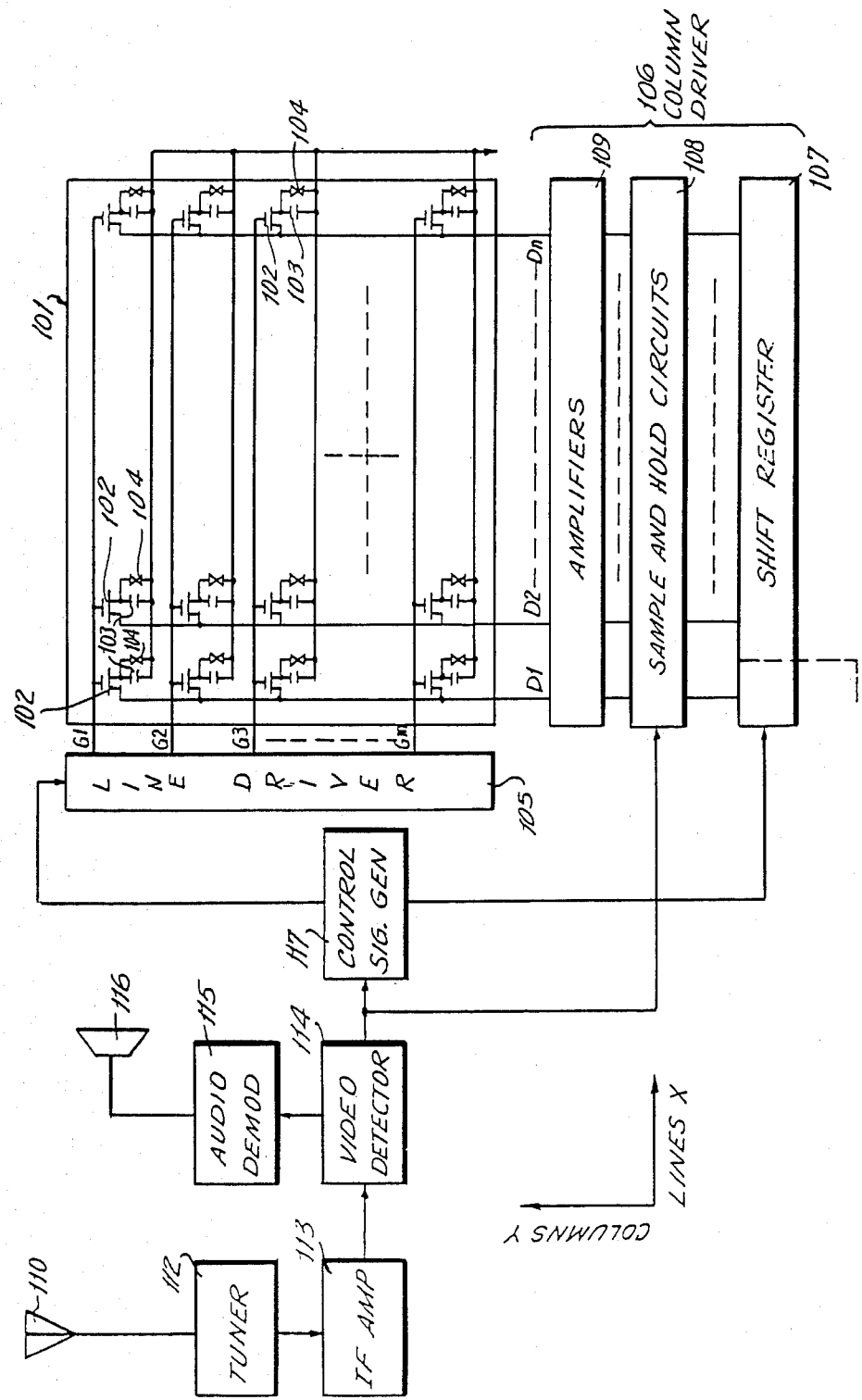
FIG. 1 is a semi-schematic/functional block diagram of a liquid crystal matrix television set.

FIG. 1 is a functional block diagram illustrating picture elements, switching transistors and a driving circuit of a television set using a liquid crystal display. In the liquid crystal display the rear baseplate is a silicon substrate on which switching elements comprising MOS transistors and picture element electrodes are arranged in a matrix. The television set includes a liquid crystal panel 101 having picture elements arranged in n-columns spaced apart in the direction X and m-lines spaced apart in the direction Y. The liquid crystal panel 101 has m×n switching transistors 102, m×n accumulating capacitors 103 and m×n liquid crystal electrodes 104 connected as shown in FIG. 1, the capacitors 103 and liquid crystal electrodes 104 connected in parallel to a common line. Transistors 102, capacitors 103 and electrodes 104 are connected to a line driver 105 and a column driver 106. The columns are designated by reference characters $D_1, D_2, \ldots D_n$. The lines are designated by reference characters $G_1, G_2, \ldots G_m$. That is, for instance, the first column is referred to as column $D_1$ hereinafter. The column driver 106 comprises an n-stage shift register 107, n sample and hold circuits 108 and n amplifiers 109.

A television broadcast signal from a broadcast station is received by an antenna 110 and is selected by a tuner 112. The signal thus selected is applied to an intermediate frequency amplifier 113 and the signal, amplified by the intermediate frequency amplifier 113, is demodulated by a video detector circuit 114 into a sound signal and a video signal. The sound signal is demodulated and amplified by a sound circuit 115 to drive a loudspeaker 116. On the other hand, the video signal from the video detector 114 is applied to the sample and hold circuits 108 and to a control signal generating circuit 117. The control signal generating circuit 117 operates to separate the synchronizing signal from the video signal to generate signals for controlling the column driver 106 and the line driver 105.

Figure 2:
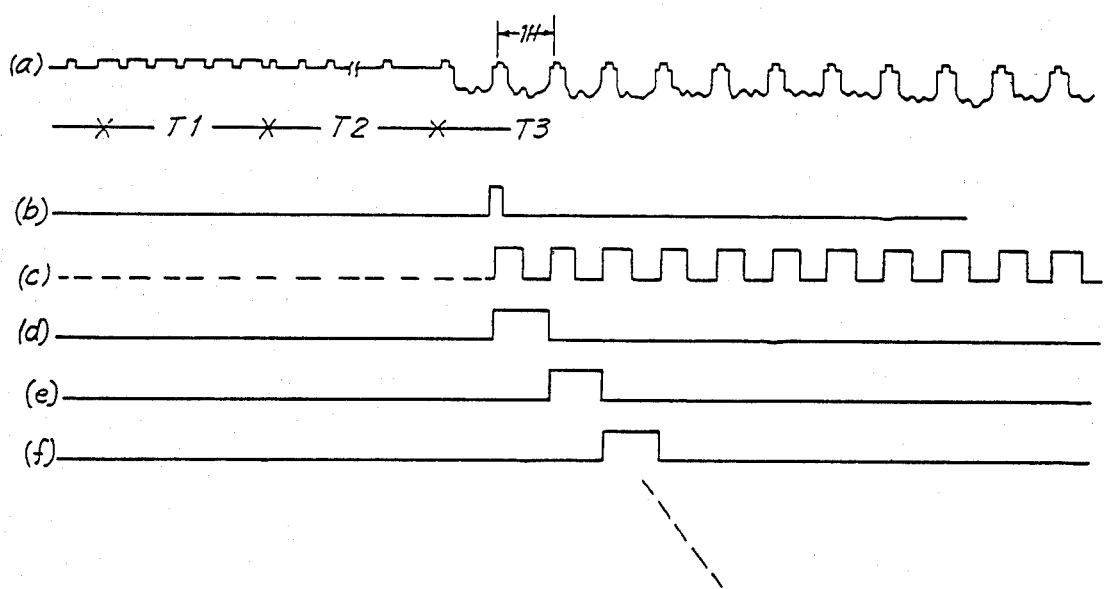
FIGS. 2 and 3 are waveform diagrams indicating the drive timing for a matrix television set.

FIG. 2 shows the waveforms of various signals in the line driver 105 where the switching transistor 102 of the liquid crystal display unit is an n-channel MOS transistor. The curve (a) of FIG. 2 shows the conventional television video signal. In the conventional manner, the vertical synchronizing signal and the horizontal synchronizing signal are superposed on the video signal. In the curve (a) of FIG. 2, $T_1$ indicates the vertical synchronizing signal interval; $T_2$ indicates the vertical blanking interval; and $T_3$ indicates the video signal interval. The period of time between two adjacent horizontal synchronizing signals is referred to as "1H". As shown in the curves (d), (e) and (f) of FIG. 2, high potential voltage pulses are supplied to the lines $G_1, G_2$ and $G_3$, respectively, shifted by 1H from one another, to render conductive switching transistors 102 in the respective lines successively. When the switching transistors 102 are rendered conductive, the video data from the television transmission is stored in the accumulating capacitors 103 of the picture elements with a liquid crystal electric field drive. These voltage waveforms (curves d,e,f . . . ) are conventionally provided by the use of an m-stage shift register. That is, the line driver 105 is made up of a serial-in/parallel-out shift register and gate circuits.

A pulse signal as shown in curve (b) of FIG. 2 is applied to the serial-in input terminal of the shift register in response to the vertical synchronizing signal. A clock pulse having the same frequency as that of the synchronizing signal is applied as the transfer clock pulse of the shift register so that the waveforms (d,e,f . . . ) of FIG. 2 are provided in sequence, it being understood, that the number of waveforms is equal to the number of lines in the matrix. The waveforms (b) and (c) of FIG. 2 are outputted by the control signal generating circuit 117.

Figure 3:
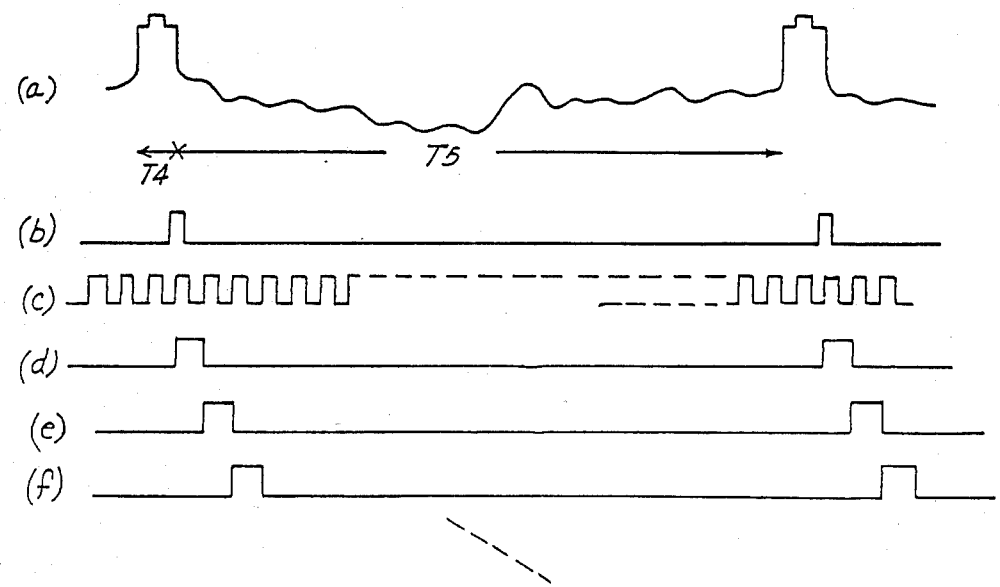

Waveforms of various signals in the column driver 106 are shown in FIG. 3. The column driver performs the same operation repeatedly in each 1H interval. The curve (a) of FIG. 3 is an enlarged diagram of one 1H interval in the video signal interval $T_3$ of FIG. 2. In the curve (a) of FIG. 3, $T_4$ designates the horizontal synchronizing signal interval and the horizontal blanking period. An interval $T_5$ is the period in which video information is included. When a signal as shown in curve (b) of FIG. 3 is applied to the serial-in input terminal of the shift register 107 in response to the horizontal synchronizing signal of the video signal (a), and a clock pulse having a frequency $\tau = T_5/n$ (curve c of FIG. 3) is provided as the transfer clock pulse, then the outputs of the stages in the shift register 107 provide pulses which are shifted from one another by $\tau$ as shown in the curves (d,e,f . . . ). In other words, the period $\tau_5$ is divided into as many portions as there are vertical columns in the matrix 101.

Each of the sample and hold circuits 108 is controlled by the output of the respective stage in the shift register 107 to sample the instantaneous voltage value of the video signal in response to the fall of the output pulse, and to hold the voltage value of the video signal until the next sampling time. The next sampling is after a 1H interval. The amplifiers 109 receive the outputs of the sample and hold circuits 108 respectively and subject the outputs to buffer amplification to drive the column electrodes through which the capacitors 103 are charged in turn. The waveform of curves (b) and (c) of FIG. 3 are provided by the control signals generating circuit 117.

As described above, the control signal generating circuit 117 generates at least four different signals in synchronization with the synchronizing signal superposed on the video signal. This type of circuit controls the signal generating circuit in almost all matrix television sets using no cathode ray tube for display. A matrix television set utilizing a light emitting diode matrix board is described in IEEE. Transactions Electronic Devices, ED 26, No. 8, pp 1182–1186, August, 1979. A matrix television set utilizing electro-luminescence boards is described in SID, Digest, pp 68–69, Apr. 30, 1980, and a matrix television set utilizing a negative glow discharge or a plasma discharge is described in SID, Digest, pp 21–23, Apr. 29, 1980. The use of shift registers for providing the horizontal and vertical "sweeping" effect in the matrix television set as described above is substantially different from a conventional television set having a cathode ray tube which uses sawtoothed waves of two frequencies for horizontal and vertical deflections.

Figure 4:
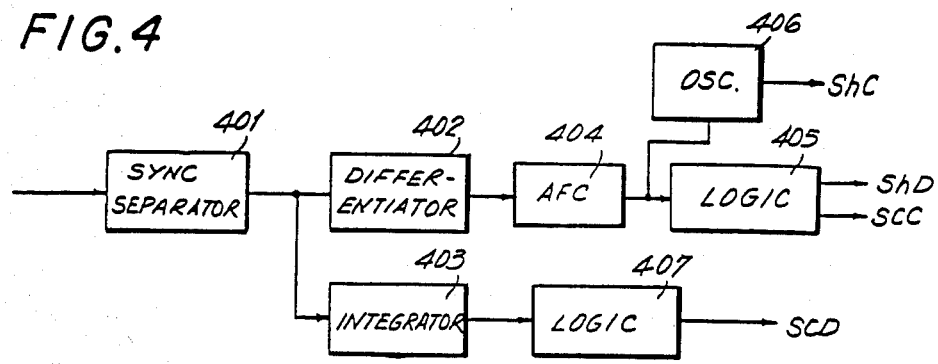
FIG. 4 is a functional block diagram of a conventional synchronizing circuit for matrix television sets.

A control signal generating circuit designed exclusively for a matrix television set has not yet been disclosed in the art. Those skilled in the art may provide a control signal generating circuit as shown in FIG. 4 using present construction techniques. In describing the circuit of FIG. 4, the curves (b) and (c) of FIG. 3 are referred to as "a shift data signal" and "a shift clock signal", respectively. The signals in the curves (b) and (c) of FIG. 2 are referred to as "a scan data signal" and "a scan lock signal", respectively.

In FIG. 4, the synchronizing signal is separated by a synchronizing separating circuit 401 and is divided into a horizontal synchronizing signal and a vertical synchronizing signal respectively by a differentiation circuit 402 and an integration circuit 403. Reference numeral 404 designates an AFC circuit or oscillator circuit which oscillates following the frequency of the horizontal synchronizing signal which is provided by the integrating circuit 402. Noise components which are mixed through the television signal transmission path are removed from the output of the AFC circuit, and then in a conventional television set using a cathode ray tube, the output of the AFC circuit is used as a trigger signal to provide a sawtoothed wave signal for horizontal scanning.

In a matrix television set, this signal output of the AFC circuit is subjected to level conversion to a logical level, or to suitable phase shift by means of a logical circuit 405. The shift clock signal is produced by an oscillator 406 which oscillates with a period $\tau$. Thereby, the shift data signal and the scan clock signal are provided. In order to display a stable picture, it is necessary that the shift clock signal be in synchronization with the horizontal synchronizing signals. For this purpose, a simple method may be employed in which the oscillator 406 is triggered with the leading edge of the horizontal synchronizing signal to start oscillation. When a crystal oscillator circuit of high stability in operation is employed as the oscillator circuit 406, then mutual synchronization is unnecessary.

On the other hand, the scan data signal is produced by means of a second logical circuit 407 which receives the vertical synchronizing signal and subjects it to level conversion and phase shift. In order to eliminate the effects of noise signals which are mixed through the television signal transmission path, a method has been employed heretofore in which a non-stable multivibrator is triggered by the vertical synchronizing signal outputted by the integration circuit 403.

A synchronizing circuit for a matrix television set having a circuit similar to that of FIG. 4 has the following disadvantages. First, many oscillator circuits are used and accordingly, the number of capacitors used is also large. Because it is difficult to provide a capacitor in the form of a monolithic integrated circuit, the capacitor must be externally connected to an integrated circuit. This makes it difficult to miniaturize the device. The number of pins for connecting the integrated circuit to the capacitor causes a direct increase in the cost of the circuits.

Secondly, power consumption for the oscillator circuit 406, adapted to output the shift clock signal, is large. When the oscillator is comprised of an integrated circuit and an external capacitor, then the oscillator consumes electric power greater than several tens of milliwatts. Additionally, it is relatively difficult to synchronize the oscillator circuit 406 which produces the shift clock signal with the horizontal synchronizing signal.

Finally, it is difficult to provide the synchronizing circuit constructed as an integrated circuit. To the present, it has not been the intent to provide the synchronizing circuit as a monolithic integrated circuit because in a cathode ray tube circuit a deflecting coil is driven and this requires a high voltage not suited to the monolithic integrated circuit.

Accordingly, objects of this invention are to provide a novel synchronizing circuit wherein the above described disadvantages of a conventional synchronizing circuit, as used in a matrix television set, are eliminated. Also, it is an object to provide a synchronization circuit in the form of a monolithic integrated circuit wherein the number of components externally connected to the integrated circuit is minimized.

Figure 5:
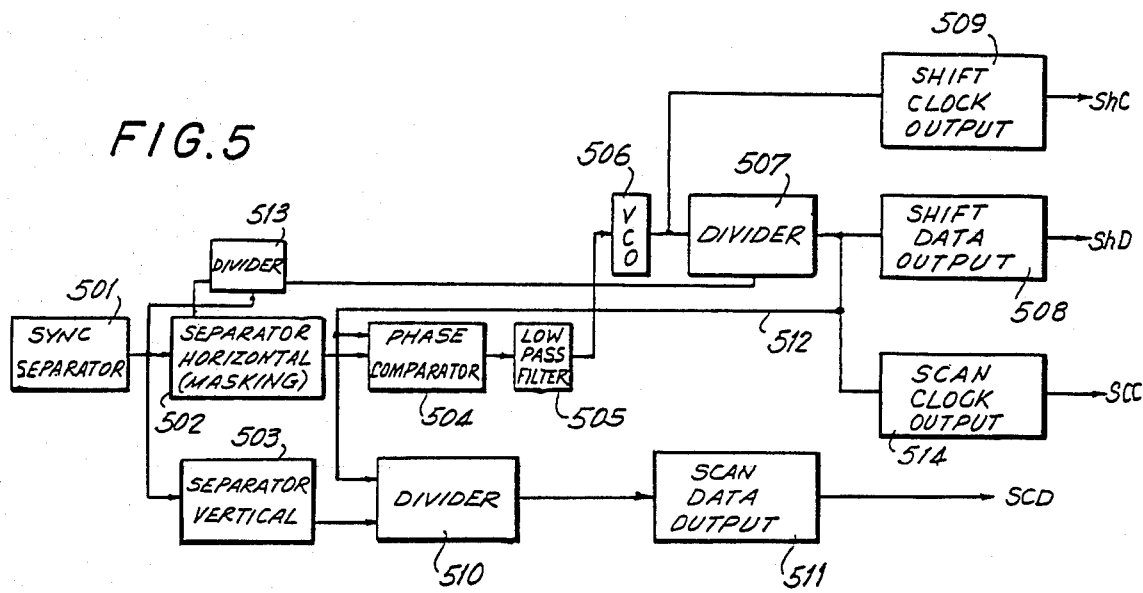
FIG. 5 is a functional block diagram of a synchronizing circuit for a matrix television set in accordance with this invention.

FIG. 5 is a functional block diagram showing a matrix television synchronizing circuit in accordance with this invention. A synchronizing separator circuit 501 separates a composite synchronizing signal from the television video transmission signal. The output of the separator circuit 501 is divided into a horizontal synchronizing signal and a vertical synchronizing signal by a frequency separator circuit. A separator circuit 502 obtains the horizontal synchronizing signal and in general comprises a differentiation circuit having a resistor and a capacitor.

Figure 6A:
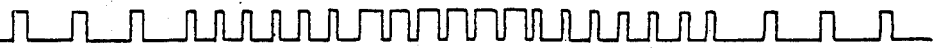
FIG. 6 is timing waveforms for the operation of a horizontal synchronizing signal separator circuit in accordance with this invention, as shown in FIG. 7.
Figure 6B:
Figure 6C:
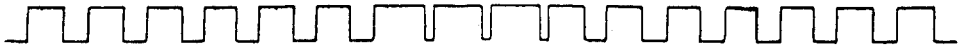

The front half of the composite synchronizing signal (a) (FIG. 6) is masked with pulses (b) having a pulse width which is more than one-half H. Pulses (b) are triggered with the leading edges of the composite synchronizing signal (a) as shown in FIG. 6. That is, the composite synchronizing signal (a) and the pulses (b) are subject to a logical summation (OR logic) to form a waveform as shown in curve (c) of FIG. 6. Only the horizontal synchronizing signal is obtained after masking the serrated pulse in the vertical synchronizing signal interval which is superposed on the composite synchronizing signal. The leading edge of the pulse (c) becomes the horizontal synchronizing signal.

The pulses (b) having a pulse width more than one-half H is obtained by subjecting the signal provided by a voltage controlled oscillator 506 (hereinafter referred to as VCO 506) to frequency division in a frequency division circuit 513. The frequency division starts with the leading edge of the compound synchronizing signal and is continued until the pulse width reaches one-half H. When the pulse width exceeds one-half H, a carry signal is provided to stop the frequency division. Inversion of the carry signal provides the pulse signals in the curve (b) at FIG. 6. If the frequency division operation of the frequency division circuit is to be started when a no-carry signal is provided, then the frequency division circuit 513 is not triggered.

In FIG. 5, the circuit includes a phase comparator 504 wherein the leading edge of a pulse signal, which is obtained by frequency dividing the output pulses of the VCO 506 by $(T_4+T_5)/\tau$ in a frequency division circuit 507, is compared with the leading edge of the horizontal synchronizing signal provided by the horizontal synchronizing signal separator circuit 502. A low pass filter 505 operates to remove high frequency components from the output of the phase comparator 504. The output of the low pass filter 505 is applied to the control terminal of the VCO 506 adjusting the VCO frequency to eliminate the phase difference. The VCO 506 oscillates with a period $\tau$. The output of the VCO is employed as the shift clock signal, and is the original oscillation output used for producing the horizontal synchronizing signal through frequency division.

In FIG. 5, the circuit includes a shift clock signal (ShC) output circuit 509 wherein the level and phase of the clock signals are adjusted so that the shift clock signal can drive a group of drivers. The output of the VCO 506 is subject to frequency division by $(T_4+T_5)/\tau$ in the division circuit 507, and the divided frequency output provides pulse which are equal in the frequency to the shift data signal and the scan clock signal.

The circuit of FIG. 5 includes a shift data signal (ShD) output circuit 508 and a scanning clock signal output circuit 514 (ScC) wherein the shift data signal and the scanning clock signal are shaped by adjusting the pulse width and phase of the frequency divider 507 output. The shift data and scan clock signals are amplified so that a group of drivers can be driven thereby.

A scan data signal (ScD) is obtained by further frequency dividing the output signal in the frequency division circuit 507 in a frequency division circuit 510. The output of the frequency division circuit 507, as stated, is equal in frequency to the horizontal synchronizing signal.

The frequency division ratio of the frequency division circuit 510 is equal to the number of horizontal scanning lines in one frame interval. Synchronization of the frequency division circuit 510 with the vertical synchronizing signal can be effected by resetting the frequency division circuit 510 with the vertical synchronizing signal provided by the vertical synchronizing signal separator circuit 503 (or an integrating circuit). In FIG. 5, an output circuit 511 sets the level, phase and pulse width of the scan data signal (ScD) and provides buffer amplification.

Figure 7:
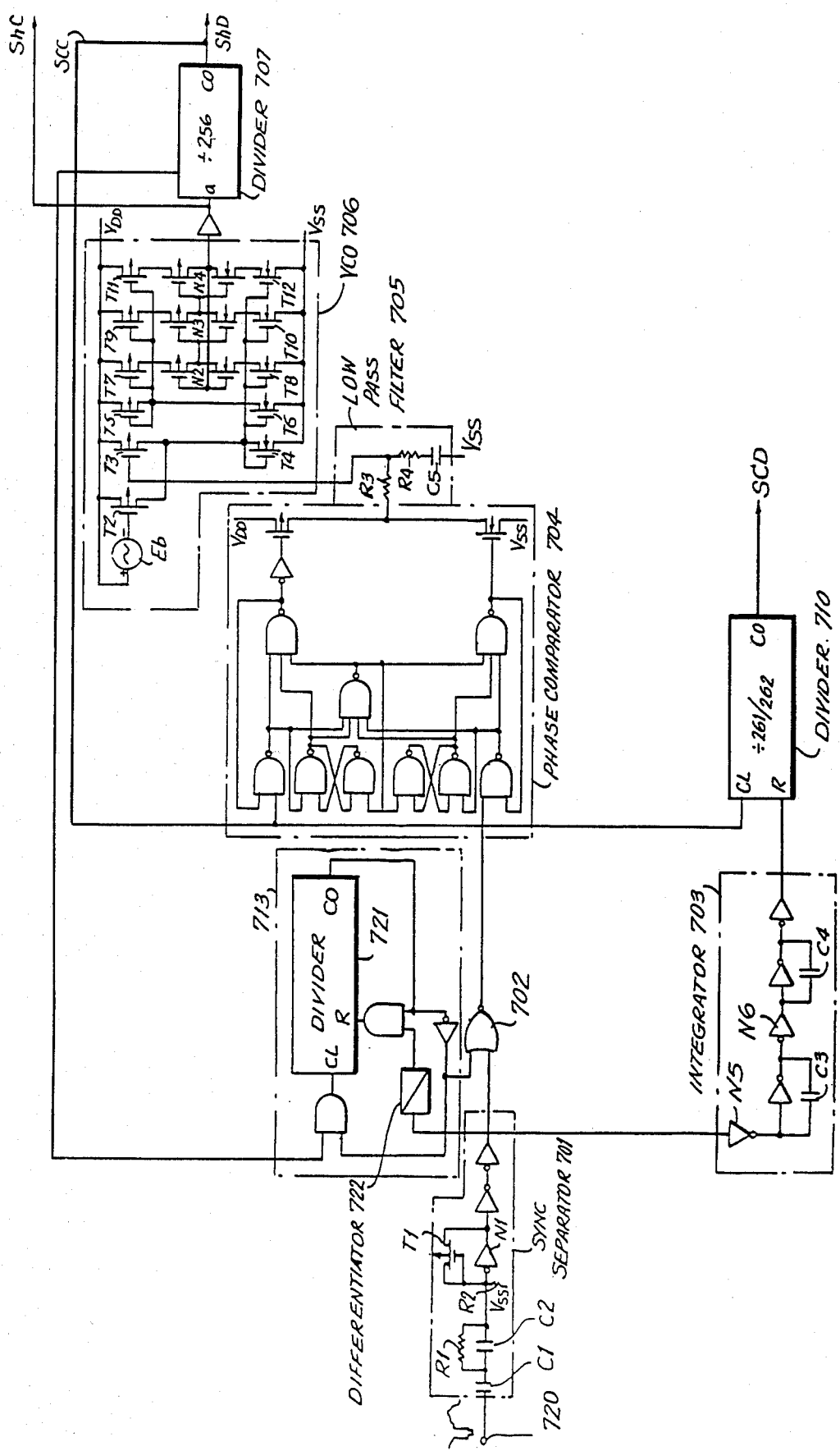
FIG. 7 is a circuit diagram of a synchronizing circuit for a matrix television set in accordance with this invention.

FIG. 7 is a circuit diagram constructed in accordance with the functions of the block diagram of FIG. 5 for a synchronizing circuit in accordance with this invention. The circuit diagram demonstrates that the circuit is realized as a MOS integrated circuit. However, it should be noted that the output circuits 508,509,511 and 514 of FIG. 5 are not included in FIG. 7. The circuit diagram of FIG. 7 is for a construction where the Japanese television standard system for the number of picture elements is about 200×200, that is, m is approximately 200 and n is approximately 200. According to the Japanese television standard system, the number of picture elements in the picture display region should be 480 by 480. However, it is difficult to provide so many picture elements for a matrix television set in the present circumferences. Also, it is sufficient for a portable television set having a picture size of two to three inches on a side to have 220×220 picture elements. Therefore, as an example, a construction where picture resolution is reduced to approximately half of the Japanese television standard system, is described. However, it should be unnecessary to state that the synchronization system in accordance with this invention can drive a matrix display panel having more picture elements than in an ordinary television set of a matrix type, e.g., 220×220.

In FIG. 7, the circuit includes a synchronizing separating circuit 701 enclosed in a broken line on the drawing. In this circuit, a television signal in which the synchronizing signal is at the low level side of the signal, and the video signal is at the high level side, is inputted. That is, the signal is obtained by inverting a signal as shown in curves (a) of FIG. 2 or 3. It should be understood that a signal as shown in the curve (a) of FIG. 2 or 3 can be inputted where the p-channel feedback transistor $T_1$ is replaced by an n-channel transistor. The charges going in and out of an input capacitor $C_1$ are equal in a balanced state. The charge and discharge time constants are made extremely unbalanced, then only the low level of the video signal applied to the input terminal 720 of the circuit 701 is picked up, whereby an amplitude separation is effected. That is, the charge and discharge time constants of the capacitor $C_1$ are made unbalanced by effecting feedback for an inverter N1 with the gate and drain electrodes of the p-channel MOS transistor T1 connected together.

Thus, when the input terminal 720 is set lower in level than the input of the inverter N1, the transistor $T_1$ is conductive to quickly charge the capacitor $C_1$. On the other hand, when the input terminals 720 is set higher, the transistor $T_1$ is rendered nonconductive, and the capacitor $C_1$ is gradually discharged through a resistor $R_2$. A resistor $R_1$ and a capacitor $C_2$ are inserted between the capacitors $C_1$ and the inverter N1 in order to suppress the effect of a pulsive noise signal which is superposed on the television signal.

A NOR circuit 702 masks the serrated pulses of the vertical synchronizing signal as with the horizontal synchronizing separator circuit 502 of FIG. 5. An integration circuit 703 operates to separate the vertical synchronizing signal. In the MOS integrated circuit, a mirror integrated circuit as illustrated is suitable as the integration circuit 703. If, in inverters $N_5$ and $N_6$, connected to the input of the mirror integration circuit, the ratio of channel width to channel length of the transistor forming each inverter is made sufficiently small to reduce the output current as much as possible, then the value of the integration capacitors $C_3$, $C_4$ can be reduced to an extent that these capacitors can be included in the integrated circuit.

In FIG. 7, the circuit includes a phase comparator 704, a low pass filter 705, and frequency divider circuits 707,710, and a circuit 713 corresponding to the circuit 513 in FIG. 5. The circuit 713 includes a frequency division circuit 721 and a differentiation circuit 722. In general, in the integrated circuit, the differentiation circuit 722 can be constructed to constitute a delay circuit and a gate circuit.

Further, in FIG. 7, the circuit includes a VCO 706. Current, provided under control of the output of the low pass filter 705 and a bias voltage Eb, is applied to the gate electrodes of current limiting transistors $T_7$ through $T_{12}$. These transistors are connected by means of transistors $T_4$, $T_5$, $T_6$ to the source electrodes of the ring oscillator made up of inverters $N_2$, $N_3$, $N_4$. Thereby, current flowing in the inverters $N_{2-4}$ is controlled by the phase comparator 704 and filter 705.

By changing the current flowing in the inverters $N_{2-4}$, the oscillating frequency of the VCO is varied in a wide range of from several tens of kilohertz to the highest frequency at which the integrated circuit is operable. With respect to the current to the transistor $T_4$, the oscillation frequency is set slightly lower than the frequency of the shift clock signal by the transistor $T_2$. The shortage in frequency is complimented by means of the transistor $T_3$. The gate electrode of the transistor $T_3$ is controlled by the lower frequency component of the output of the phase comparator 704. Feedback is effected so that the phase difference between the output of the frequency division circuit 707 and the horizontal synchronizing signal approaches zero.

The current flowing into the transistors $T_4$ is caused to flow into the transistors $T_2$ and $T_3$ to prevent a problem that the lock range of the phase clock loop becomes excessively wide. The bias voltage Eb can be produced inside the integrated circuit, or in view of the fluctuation and characteristics of the circuit elements, the voltage Eb may be provided by dividing a supply voltage with a variable resistor provided externally. It is necessary that the transistors formed in the ring oscillator are smaller in transconductance, or in the ratio of channel width to channel length, than the transistors forming the other logic circuit in the integrated circuit. Otherwise, the oscillation frequency becomes excessively high.

Values of the resistors and capacitors in the circuit of FIG. 7 are substantially as follows:
$C_1$: 0.01–1 μF
$C_2$: 100–1000 pF
$C_3$ and $C_4$: Several pico-farads (pF)
$C_5$: 0.01–1 μF
$R_1$: Several hundreds of ohms (Ω)
$R_2$: Several tens of megohms (MΩ)
$R_3$: Several hundreds of kilo-ohms (KΩ)
$R_4$: Several tens of kilo-ohms (KΩ)

The resistance values of these resistors can be achieved with MOS resistors or diffusion resistors in the MOS integrated circuit. With present techniques, it is necessary to externally connect the capacitors $C_1$, $C_2$ and $C_5$ to the integrated circuit. However, the number of such capacitors in the circuit in accordance with this invention is much less than that in the prior art system which typically require several more than ten capacitors.

A comparison is now made of the circuit, in accordance with this invention as shown in FIG. 7 with a circuit which those skilled in the art can conceive in accordance with the prior art concepts corresponding to FIG. 4. First, the conventional circuit needs three oscillator circuits, namely, AFC circuit 404, the vertical oscillator circuit 403 and the shift clock generator 406. Each of these circuits have externally connected components. On the other hand, in the circuit in accordance with this invention, only one oscillator circuit, namely, the VCO 706, is used. This VCO 706 includes no externally connected components.

Secondly, in the circuit shown in FIG. 7, in accordance with this invention, it is sufficient to design a shift clock oscillator VCO which may inherently have a low stability in oscillation frequency. This circuit is satisfactory because the frequency is maintained synchronous with the horizontal synchronizing signal by the action of the phase locked feedback loop. Although the ring oscillator is poor in oscillation stability, it can achieve the highest necessary frequency oscillation with the least power consumption. In addition, it is unnecessary to externally connect capacitors, or the like to the integrated circuit to provide the ring oscillator, as stated above. In the invention, such an oscillator circuit is employed, and accordingly, the number of externally connected components is small and power consumption is reduced.

When the circuit shown in FIG. 7 was constructed in the form of a CMOS integrated circuit, power consumption was several milliwatts in total with the supply voltage set to 8 volts and with the shift clock frequency set to approximately 4 MHz.

As described above, the synchronizing circuit of a matrix television set, in accordance with this invention, can be made of components which are of minimum in size and consume minimum power. Therefore, the synchronizing circuit is suitable for a portable liquid crystal matrix television set. As stated above, the synchronizing circuit is also suitable for other types of matrix television sets using, for example, light-emitting diodes.

It will thus been seen that the objects set forth above, among those made apparent from the preceeding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a synchronizing circuit for a matrix television set having display means including picture elements arranged in a matrix of lines and columns, and connected to line driver and column driver circuits respectively so as to be individually selectable in both line and column directions, and wherein display is made by selecting lines and columns successively, the improvement therein comprising:

a voltage controlled oscillator circuit, said oscillator circuit producing a shift clock signal applied to said column driver circuits for selecting individual columns in succession;

said voltage controlled oscillator comprising a plurality of similar CMOS pairs connected in a sequence to form a ring oscillator, the drains of a first CMOS pair being connected to the gates of a second CMOS pair and the drains of said second CMOS pair being connected to the gates of a third CMOS pair and so on, the drains of the last of said plurality of CMOS pairs being connected to the gates of said first CMOS pair, the number of CMOS pairs in said plurality being an odd integer, the sources of each CMOS pair being connected respectively to the high and low side terminals of a power source, said CMOS pair sources being separated from said terminals by limiting transistors having their drains in series with the source/drains of said CMOS pairs, sources of each P channel transistor in said CMOS pairs being separated from one of said power source terminals by a P channel limiting transistor, sources of each N channel transistor in said CMOS pairs being separated from the other of said power source terminals by an N channel limiting transistor, the gates of said P channel limiting transistors being connected together and the gates of said N channel limiting transistors being connected together, and means for providing a variable bias on the gates of said limiting transistors;

first frequency divider means for dividing down an output frequency signal from said oscillator circuit, the output of said first frequency divider means being a clock signal applied to said line driver circuits for selecting individual lines in succession;

phase comparison means, said comparison means determining the difference in phase of a output of said first frequency divider means with the phase of a horizontal synchronizing signal, said horizontal synchronizing signal being a portion of a television signal transmission, an output of said comparison means being fed back to said oscillator circuit, said feedback being in proportion to said phase difference, said oscillator circuit being adapted to adjust the output frequency of oscillation in response to said phase difference signal, said adjustment causing said phase difference to approach zero, said clock signals being synchronized with said horizontal synchronizing signal.

2. A voltage controlled oscillator comprising a plurality of similar CMOS pairs connected in a sequence to form a ring oscillator, the drains of a first CMOS pair being connected to the gates of a second CMOS pair and the drains of said second CMOS pair being connected to the gates of a third CMOS pair and so on, the drains of the last of said plurality of CMOS pairs being connected to the gates of said first CMOS pair, the number of CMOS pairs in said plurality being an odd integer, the sources of each CMOS pair being connected respectively to the high and low side terminals of a power source, said CMOS pair sources being separated from said terminals by limiting transistors having their drains in series with the source/drains of said CMOS pairs, sources of each P channel transistor in said CMOS pairs being separated from one of said power source terminals by a P channel limiting transistor, sources of each N channel transistor in said CMOS pairs being separated from the other of said power source terminals by an N channel limiting transistor, the gates of said P channel limiting transistors being connected together and the gates of said N channel limiting transistors being connected together, and means for providing a variable bias on the gates of said separating transistors.

3. A voltage controlled oscillator as claimed in claim 2, wherein said means for varying the voltage bias on said limiting transistor gates is adapted to increase and decrease the resistance of each of said limiting transistors concurrently, current flow to said CMOS pairs being increased or decreased concurrently, the frequency of an output taken from said last CMOS transistor pair increasing when the resistance of said limiting transistors decreases and decreasing when said resistance increases.

4. A voltage controlled oscillator as claimed in claim 3 wherein said means to control the gate voltage bias on said limiting transistors includes transistor pairs, each pair comprises a P channel and N channel transistor in series connected across said power source terminals, the gate of one said P channel transistor in one said pair being connected to the gates of said P channel limiting transistors, and the gates of both said N channel transistors in said pairs being connected to the gates of said N channel limiting transistors, the gate of the other said P channel transistor in said pairs being driven from an external source of variable voltage.

5. A voltage controlled oscillator as claimed in claim 4, and further comprising a transistor having its source/drain terminals in parallel with the source/drain terminals of said transistor having its control terminal voltage subject to said external variable voltage source, the gate of said parallel transistor having a fixed voltage applied thereto.

6. A voltage controlled oscillator as claimed in claim 3, wherein said means to control the gate voltage bias on said limiting transistors comprises a P channel and N channel transistor in series connected across said power source terminals, the gate of said P channel transistor being connected to the gates of said P channel limiting transistors and the gate of said N channel transistor of said transistors in series being connected to the gates of said N channel limiting transistors, the bias voltage applied to the gate of one of said transistors in series being derived from a voltage divider network comprised of variable resistances in series across said power source terminals.

7. A voltage controlled oscillator as claimed in claim 6, wherein said variable resistances in series are N and P transistors, said bias voltage being tapped between said variable resistances, at least one of said variable resistances being varied by a voltage input to the control terminal thereof from an external variable voltage source.

8. A voltage controlled oscillator as claimed in claim 7 and further comprising a transistor having its source/drain terminals in parallel with the source/drain terminals of said transistor having its control terminal voltage subject to said external variable voltage source, the gate of said parallel transistor having a fixed voltage applied thereto.

9. A voltage controlled oscillator as claimed in claim 8, wherein said voltage controlled oscillator circuit is entirely integrated.

10. A voltage controlled oscillator as claimed in claim 9, wherein said voltage controlled oscillator circuit is entirely integrated.

11. A voltage controlled oscillator as claimed in claim 10, wherein said integrated circuit includes MOS FETS.

* * * * *